(12) United States Patent
Tosaya et al.

(10) Patent No.: US 7,082,395 B2
(45) Date of Patent: *Jul. 25, 2006

(54) SIGNAL INJECTION COUPLING INTO THE HUMAN VOCAL TRACT FOR ROBUST AUDIBLE AND INAUDIBLE VOICE RECOGNITION

(76) Inventors: Carol A. Tosaya, 897 Madonna Way, Los Altos, CA (US) 94024; John W. Sliwa, Jr., 897 Madonna Way, Los Altos, CA (US) 94024

( * ) Notice: Subject to any disclaimer, the term of this patent is extended or adjusted under 35 U.S.C. 154(b) by 607 days.

This patent is subject to a terminal disclaimer.

(21) Appl. No.: 10/265,468

(22) Filed: Oct. 3, 2002

(65) Prior Publication Data

US 2003/0061050 A1 Mar. 27, 2003

Related U.S. Application Data

(62) Division of application No. 09/348,600, filed on Jul. 9, 1999, now Pat. No. 6,487,531.

(51) Int. Cl.
*G10L 15/00* (2006.01)

(52) U.S. Cl. .................. 704/246; 704/261
(58) Field of Classification Search ............ 704/200, 704/231, 246, 261
See application file for complete search history.

(56) References Cited

U.S. PATENT DOCUMENTS

| | | | |
|---|---|---|---|
| 3,766,318 A | 10/1973 | Webb | |
| 4,039,756 A | 8/1977 | Burtschi | |
| 4,223,411 A | 9/1980 | Schoendorfer et al. | |
| 4,343,969 A * | 8/1982 | Kellett | 704/254 |
| 4,473,905 A | 9/1984 | Katz et al. | |
| 4,502,150 A | 2/1985 | Katz et al. | |
| 4,627,095 A * | 12/1986 | Thompson | 381/70 |
| 4,691,360 A | 9/1987 | Bloomfield | |
| 4,706,292 A | 11/1987 | Torgeson | |
| 4,709,390 A | 11/1987 | Atal et al. | |
| RE32,580 E | 1/1988 | Atal et al. | |
| 4,821,326 A | 4/1989 | MacLeod | |
| 4,993,071 A | 2/1991 | Griebel | |

(Continued)

FOREIGN PATENT DOCUMENTS

EP 00138071 B1 1/1988

(Continued)

OTHER PUBLICATIONS

M. Al-Akaidi, "Simulation Model Of The Vocal Tract Filter For Speech Synthesis", *Simulation*, vol. 67, No. 4, pp. 241-246 (Oct. 1996).

(Continued)

*Primary Examiner*—Daniel Abebe
(74) *Attorney, Agent, or Firm*—David W Collins (57) ABSTRACT

A means and method are provided for enhancing or replacing the natural excitation of the human vocal tract by artificial excitation means, wherein the artificially created acoustics present additional spectral, temporal, or phase data useful for (1) enhancing the machine recognition robustness of audible speech or (2) enabling more robust machine-recognition of relatively inaudible mouthed or whispered speech. The artificial excitation (a) may be arranged to be audible or inaudible, (b) may be designed to be non-interfering with another user's similar means, (c) may be used in one or both of a vocal content-enhancement mode or a complimentary vocal tract-probing mode, and/or (d) may be used for the recognition of audible or inaudible continuous speech or isolated spoken commands.

64 Claims, 3 Drawing Sheets

U.S. PATENT DOCUMENTS

| | | | |
|---|---|---|---|
| 5,111,501 A | 5/1992 | Shimanuki |
| 5,326,349 A | 7/1994 | Baraff |
| 5,390,278 A | 2/1995 | Gupta et al. |
| 5,502,774 A | 3/1996 | Bellegarda et al. |
| 5,535,305 A | 7/1996 | Acero et al. |
| 5,586,215 A | 12/1996 | Stork et al. |
| 5,596,676 A | 1/1997 | Swaminathan et al. |
| 5,621,809 A | 4/1997 | Bellegarda et al. |
| 5,640,485 A | 6/1997 | Ranta |
| 5,640,490 A | 6/1997 | Hansen et al. |
| 5,664,052 A | 9/1997 | Nishiguchi et al. |
| 5,706,397 A | 1/1998 | Chow |
| 5,729,694 A | 3/1998 | Holzrichter et al. |
| 5,752,001 A | 5/1998 | Dulong |
| 5,805,745 A | 9/1998 | Graf |
| 6,006,175 A | 12/1999 | Holzrichter |

FOREIGN PATENT DOCUMENTS

| | | |
|---|---|---|
| WO | WO09711453 A1 | 3/1997 |

OTHER PUBLICATIONS

B. Bergeron, "Using An Intraural Microphone Interface For Improved Speech Recognition", *Collegiate Microcomputer*, vol. 8, No. 3, pp. 231-238 (Aug. 1990).

A. Syrdal et al, *Applied Speech Technology*, CRC Press p. 28, (1995).

R. Cole et al Ed., *Survey of the State of the Art in Human Language Technology*, Cambridge University Press and Giardini Editori E. Stampatori In Pisa, vol. XII, XIII, Sections 9.4-9.6, (1997).

J. Epps et al, "A novel instrument to measure acoustic resonances of the vocal tract during phonation", Meas. Sci. and Technol., vol. 8, pp. 1112-1121 (1997).

D. Maurer et al, "Re-examination of the relation between the vocal tract and the vowel sound with electromagnetic articulography (EMA) in vocalizations", *Clinical Linguistics and Phonetics*, vol. 7, No. 2, pp. 129-143 (1993).

New Eagle Tactical Headset, http://www.streetpro.com/bonephone.html.

Pama Throat Microphone, http://www.pama.co.uk/pr01.html.

J.F. Holzrichter et al, "Speech articulator measurements using low power EM-wave sensors", http://speech.11n1.gov/SpeechArtMeasure.html.

\* cited by examiner

SIGNAL INJECTION COUPLING INTO THE HUMAN VOCAL TRACT FOR ROBUST AUDIBLE AND INAUDIBLE VOICE RECOGNITION

CROSS-REFERENCE TO RELATED APPLICATION

The present application is a divisional application of application Ser. No. 09/348,600, filed Jul. 9, 1999 now U.S. Pat. No. 6,487,531.

TECHNICAL FIELD

The present invention is directed generally to voice recognition, and, more particularly to a means and method for enhancing or replacing the natural excitation of a living body's vocal tract by artificial excitation means.

BACKGROUND ART

The ability to vocally converse with a computer is a grand and worthy goal of hundreds of researchers, universities and institutions all over the world. Such a capability is widely expected to revolutionize communications, learning, commerce, government services and many other activities by making the complexities of technology transparent to the user. In order to converse, the computer must first recognize what words are being said by the human user and then must determine the likely meaning of those words and formulate meaningful and appropriate ongoing responses to the user. The invention herein addresses the recognition aspect of the overall speech understanding problem.

It is well known that the human vocal system can be roughly approximated as a source driving a digital (or analog) filter; see, e.g., M. Al-Akaidi, "Simulation model of the vocal tract filter for speech synthesis", *Simulation*, Vol. 67, No. 4, p. 241–246 (October 1996). The source is the larynx and vocal chords and the filter is the set of resonant acoustic cavities and/or resonant surfaces created and modified by the many movable portions (articulators) of the throat, tongue, mouth/throat surfaces, lips and nasal cavity. These include the lips, mandible, tongue, velum and pharynx. In essence, the source creates one or both of a quasi-periodic vibration (voiced sounds) or a white noise (unvoiced sounds) and the many vocal articulators modify that excitation in accordance with the vowels, consonants or phonemes being expressed. In general, the frequencies between 600 to 4,000 Hertz contain the bulk of the necessary acoustic information for human speech perception (B. Bergeron, "Using an intraural microphone interface for improved speech recognition", *Collegiate Microcomputer*, Vol. 8, No. 3, pp. 231–238 (August 1990)), but there is some human-hearable information all the way up to 10,000 hertz or so and some important information below 600 hertz. The variable set of resonances of the human vocal tract are referred to as formants and are indicated as F1, F2 . . . In general, the lower frequency formants F1 and F2 are usually in the range of 250 to 3,000 hertz and contain a major portion of human-hearable information about many articulated sounds and phonemes. Although the formants are principle features of human speech, they are by far not the only features and even the formants themselves dynamically change frequency and amplitude, depending on context, speaking rate, and mood. Indeed, only experts have been able to manually determine what a person has said based on a printout of the spectrogram of the utterance—and even this analysis contains best-guesses. Thus, automated speech recognition is one of the grand problems in linguistic and speech sciences. In fact, only the recent application of trainable stochastic (statistics-based) models using fast micro-processors (e.g., 200 Mhz or higher) has resulted in 1998's introduction of inexpensive continuous speech (CS) software products. In the stochastic models used in such software, referred to as Hidden Markov Models (HMMs), the statistics of varying annunciation and temporal delivery are statistically captured in oral training sessions and made available as models for the internal search engine(s).

Major challenges to speech recognition software and systems development progress have historically been that (a) continuous speech (CS) is very much more difficult to recognize than single isolated-word speech and (b) different speakers have very different voice patterns from each other. The former is primarily because in continuous speech, we pronounce and enunciate words depending on their context, our moods, our stress state, and on the speed with which we speak. The latter is because of physiological, age, sex, anatomical, regional accent, and other reasons. Furthermore, another major problem has been how to reproducibly get the sound (natural speech) into the recognition system without loss or distortion of the information it contains. It turns out that the positioning of and type of microphone(s) or pickups one uses are critical. Head-mounted oral microphones, and the exact positioning thereof, have been particularly thorny problems despite their superior frequency response. Some attempts to use ear pickup microphones (see, e.g., Bergeron, supra) have shown fair results despite the known poorer passage of high frequency content through the bones of the skull. This result sadly speaks volumes to the positioning difficulty implications of mouth microphones which should give substantially superior performance based on their known and understood broader frequency content.

Recently, two companies, IBM and Dragon Systems, have offered commercial PC-based software products (IBM ViaVoice™ and Dragon Naturally Speaking™) that can recognize continuous speech with fair accuracy after the user conducts carefully designed mandatory training or "enrollment" sessions with the software. Even with such enrollment, the accuracy is approximately 95% under controlled conditions involving careful microphone placement and minimal or no background noise. If, during use, there are other speakers in the room having separate conversations (or there are reverberant echoes present), then numerous irritating recognition errors can result. Likewise, if the user moves the vendor-recommended directional or noise-canceling microphone away, or too far, from directly in front of the lips, or speaks too softly, then the accuracy goes down precipitously. It is no wonder that speech recognition software is not yet significantly utilized in mission-critical applications.

The inventors herein address the general lack of robustness described above in a manner such that accuracy during speaking can be improved, training (enrollment) can be a more robust if not a continuous improvement process, and one may speak softly and indeed even "mouth words" without significant audible sound generation, yet retain recognition performance. Finally, the inventors have also devised a means for nearby and/or conversing speakers using voice-recognition systems to automatically have their systems adapted to purposefully avoid operational interference with each other. This aspect has been of serious concern when trying to insert voice recognition capabilities into a busy office area wherein numerous interfering (overheard) conversations cannot easily be avoided.

The additional and more reproducible artificial excitations of the invention may also be used to increase the acoustic uniqueness of utterances-thus speeding up speech recognition processing for a given recognition-accuracy requirement. Such a speedup could, for example, be realized from the reduction in the number of candidate utterances needing software-comparison. In fact, such reductions in utterance identification possibilities also improve recognition accuracy as there are fewer incorrect conclusions to be made.

Utterance or speech-recognition practiced using the invention may have any purpose including, but not limited to: (1) talking to, commanding or conversing with local or remote computer, computer-containing products, telephony products or speech-conversant products (or with other persons using them); (2) talking to or commanding a local or remote system that converts recognized speech or commands to recorded or printed text or to programmed actions of any sort (e.g.: voice-mail interactive menus, computer-game control systems); (3) talking to another person(s) locally or remotely-located wherein one's recognized speech is presented to the other party as text or as a synthesized voice (possibly in his/her different language); (4) talking to or commanding any device (or connected person) discretely or in apparent silence; (5) user-identification or validation wherein security is increased over prior-art speech fingerprinting systems due to the additional information available in the speech signal or even the ability to manipulate artificial excitations oblivious to the user; (6) allowing multiple equipped speakers to each have their own speech recognized free of interference from the other audible speakers (regardless of their remote locations or collocation); (7) adapting a users "speech" output to obtain better recognition-processing performance as by adding individually-customized artificial content for a given speaker and making that content portable if not network-available. (This could also eliminate or minimize retraining of new recognition systems by new users.)

DISCLOSURE OF INVENTION

In accordance with the present invention, a means and method are disclosed for enhancing or replacing the natural excitation of the human vocal tract by artificial excitation means wherein the artificially created acoustics present additional spectral, temporal or phase data useful for (1) enhancing the machine recognition robustness of audible speech or (2) enabling more robust machine-recognition of relatively inaudible mouthed or whispered speech. The artificial excitation may be arranged to be audible or inaudible, may be designed to be non-interfering with another users similar means, may be used in one or both of a vocal content-enhancement mode or a complimentary vocal tract-probing mode and may be used for the recognition of audible or inaudible continuous speech or isolated spoken commands.

Specifically, an artificial acoustic excitation means is provided for acoustic coupling into a functional vocal tract working in cooperation with a speech recognition system wherein the artificial excitation coupling characteristics provide(s) information useful to the identification of speech by the system.

The present invention extends the performance and applicability of speech-recognition in the following ways:

(1) Improves speech-recognition accuracy and/or speed for audible speech;

(2) Eliminates recognition-interference (accuracy degradation) due to competing speakers or voices, (e.g., as in a busy office with many independent speakers);

(3) Newly allows for voice-recognition of silent or mouthed/whispered speech (e.g., for discretely interfacing with speech-based products and devices); and (4) Improves security for speech-based user-identification or user-validation;

In essence, the human vocal tract is artificially excited, directly or indirectly, to produce sound excitations, which are articulated by the speaker. These sounds, because they are artificially excited, have far more latitude than the familiar naturally excited voiced and aspirated human sounds. For example, they may or may not be audible, may excite natural vocal articulators (audibly or inaudibly) and/or may excite new articulators (audibly or inaudibly).

Artificially excited "speech" output may be superimposed on normal speech to increase the raw characteristic information content. Artificially excited output may be relatively or completely inaudible thus also allowing for good recognition-accuracy while whispering or even mouthing words. Artificial content may help discern between competing speakers thus-equipped, whether they are talking to each other or are in separate cubicles. Artificial content may also serve as a user voiceprint.

Systems taking advantage of this technology may be used for continuous speech or command-style discrete speech. Such systems may be trained using one or both of natural speech and artificial speech.

The artificial excitations may incorporate any of several features including: (a) broadband excitation, (b) narrow band excitation(s) such as a harmonic frequency of a natural formant, (c) multiple tones wherein the tones phase-interact with articulation (natural speech hearing does not significantly involve phase), (d) excitations which are delivered (or processed) only as a function of the success of ongoing natural-speech recognition, and (e) excitations which are feedback-optimized for each speaker.

The user need not be aware of the added acoustic information nor of it's processing.

Consumer/business products incorporating the technology may include computers, PCs, office-wide systems, PDAs, terminals, telephones, games, or any speech-conversant, speech-controlled or sound-controlled appliance or product. For the discrete inaudible option, such products could be used in public with relative privacy. Additional police, military and surveillance products are likely.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

BEST MODES FOR CARRYING OUT THE INVENTION

Reference is now made in detail to a specific embodiment of the present invention, which illustrates the best mode presently contemplated by the inventors for practicing the invention. Alternative embodiments are also briefly described as applicable.

Definitions:

Natural exciter or excitation: The vocal chords/larynx or other acoustics-producing parts of a natural living or human body; and the acoustic excitation naturally produced by such parts or organs.

Artificial exciter or excitation: A man-made acoustic-producing device acoustically coupled, directly or indirectly, into the vocal tract; and the acoustic excitation injected or caused by the device.

Pickup: A device which converts acoustic energy into a processable form such as a microphone. Typically used to detect output coming directly or indirectly from the vocal tract as a result of an excitation of the tract.

Natural acoustics, sound or signal: That which emanates from the vocal tract or from any body part acoustically coupled to the vocal tract in response to the natural excitation of the larynx/vocal chords or of any other natural anatomical sound-producing organ.

Artificial acoustics, sound or signal: That which emanates from the vocal tract or from any body part acoustically coupled to the vocal tract in response to the artificial excitation caused by a man-made exciter directly or indirectly coupled to the vocal tract.

Speech: Spoken or articulated sounds uttered or silently mouthed for communication or command-giving. In the case of the artificial excitation of the present invention, the speech signal which is generated by that portion of the total excitation may or may not be audible and may or may not itself be understandable to a human.

Figure 1:
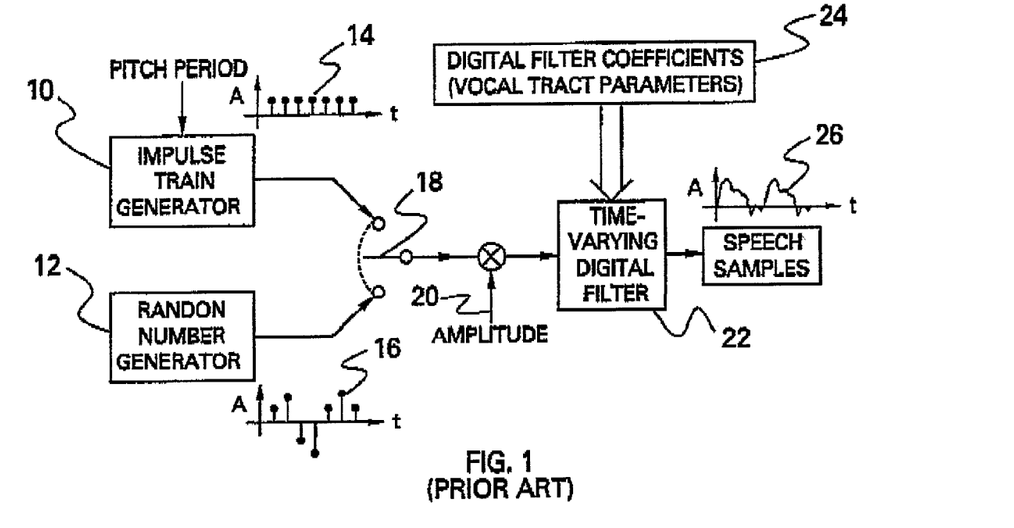
FIG. 1 is a prior-art schematic digital representation of the source/filter model of the human vocal tract.

Background:

FIG. 1 depicts a prior-art digital schematic representation of a source/filter model of the human vocal apparatus. Humans have two general kinds of natural sound excitations, or sources, capable of driving their many natural resonant structures. The first type are quasi-pitched vibratory tones coming from the vibrating vocal chords. The second type is "white noise" coming from air aspirated through the vocal chords while they are held open and are not significantly vibrating. In both cases, air is forced past the chords from the lungs. In general, vowels primarily utilize the vibrating vocal chords and a relatively open vocal tract (filter) and are termed "voiced". Also, in general, many of the consonants utilize aspiration "white noise" and a relatively closed vocal tract and are termed "unvoiced".

On the left hand side of FIG. 1 is seen two blocks 10, 12 representing the two natural human excitation sources described above. The "impulse train generator" 10 represents the vibrating vocal chords capable of producing quasi-pitched vibrations or sounds 14. The "random number generator" 12 represents the "white noise" generated as air is forced past (aspirated past) the open relaxed vocal chords to produce aperiodic sound vibrations 16. It will be noted that a switch 18 is shown capable of switching the excitation source between either type. Humans, in general, switch back and forth between source types (voiced 14 and unvoiced sounds 16) as they speak. Also shown in FIG. 1 is an amplitude or gain control 20 capable of controlling the amplitude of either excitation source. Humans, by varying their lung pressure and vocal chord tension, can control the loudness of the excitations 14 or 16. Moving to the right in the schematic signal path of FIG. 1, a schematic "time varying digital filter" 22 is depicted. This is the filter of the source/filter model. In essence, filter 22 is a set of the various acoustic filters or is a "filter network" representing the many articulators in the vocal tract. The cooperative moving of these articulators modifies the filtering properties such that different sounds can be generated from the limited excitation sources. In natural speech, the brain controls how the vocal tract articulators (lips, tongue, mouth, vocal chords, etc.) should be positioned or arranged to create excitation modification recognizable as vowels, consonants or phonemes. Block 24 represents the dynamic positioning process of the many articulators. Overall, for a given set of articulator positions, a combined setting for filter 22 is established. As speech takes place, the filter settings vary to cause the desired phonemes or speech sounds. A sample of articulated speech 26 is indicated coming out of the filter 22.

Figure 2:
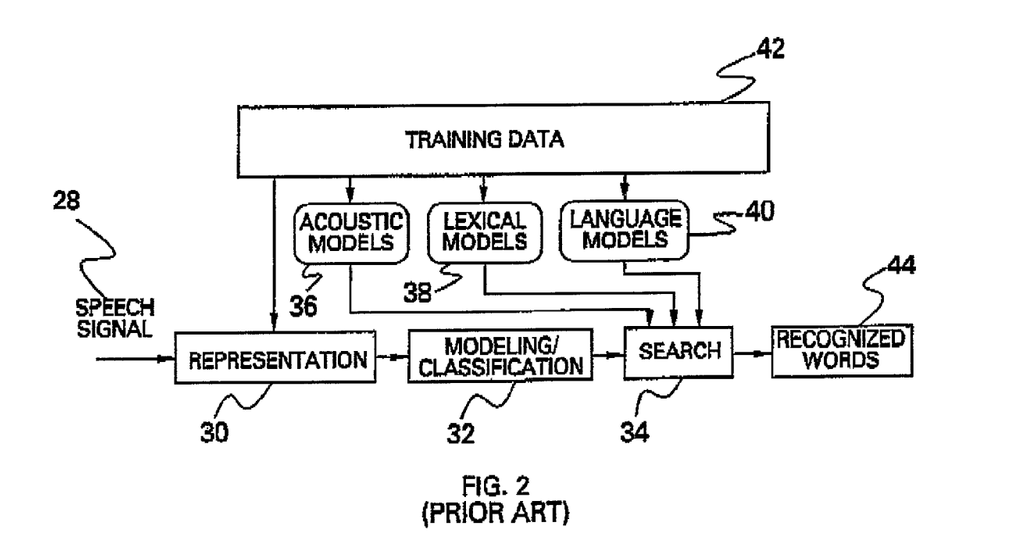
FIG. 2 is a prior-art generic representation of a typical modern speech recognition system.

Before proceeding, it is useful to review what a generic prior-art modern speech recognition system looks like. Referring to FIG. 2, a natural speech signal 28 is depicted, perhaps the output of a headset microphone, passing into a box 30 labeled "representation". Typically, representation would consist of sampling the speech signal 28 every 10 or 20 msec at a rate between 6.6 and 20 Khz. These samples are typically processed to produce a sequence of vectors, each of which usually contains 10 to 20 characteristic parameters. Modeling and classification of these vectors is done in the "modeling/classification" box 32. Finally, a search means 34 with access to acoustic model(s) 36, lexical model(s) 38, and language model(s) 40 determines the most likely identity of the sounds and the words they make up. A "training data" block 42 represents the pre-learned "enrollment" knowledge taught to the system. Based on the training data 42 and analysis thereof, the system assembles models 36, 38, and 40 before the user proceeds with routine use of the system. Thus, generally, when one thereafter speaks to the system, the pre-taught models 36, 38, 40 as well as training data are accessed in a real-time search process to understand what is being said. Training is generally done once only; however, during later use of the system, the user frequently needs to correct single-word errors or add new words, and these corrections represent further incremental training. "Recognized words" output 44 are the most likely uttered words, taking into account their fit to the acoustic (sound) models 36, the lexical (word) models 38, and the word co-relationship (language) models 40.

Useful prior art patents teaching such speech recognition systems hardware and software include the following references: U.S. Pat. No. 5,111,501 ("Speech Recognition Telephone"), U.S. Pat. No. 5,390,278 ("Phoneme-Based-Speech Recognition"), U.S. Pat. No. 5,502,774 ("Multiple Source Recognition"), U.S. Pat. No. 5,535,305 ("Vector Quantization"), U.S. Pat. No. 5,586,215 ("Acoustic/Visual Speech Recognition Device"), U.S. Pat. No. 5,596,676 ("Recognition Algorithm"), U.S. Pat. No. 5,621,809 ("Multiple Source Recognition"), U.S. Pat. No. 5,640,485 ("Speech Recognition System"), U.S. Pat. No. 5,640,490 ("Speech Recognition Microphone System"), U.S. Pat. No. 5,664,052 ("Voiced/Unvoiced Detector"), U.S. Pat. No. 5,706,397 ("Acoustic Matching of Phones"), U.S. Pat. No. 5,752,001 ("Viterbi Scoring"), and U.S. Pat. No. 5,805,745 ("Facial Recognition"); European Patent EP 00138071 B1 ("Method of Determining Excitation Condition"); and PCT publication WO 09711453 A1 ("Voice Recognition Display Device Apparatus and Method").

Present Invention:

One means of tackling a thorny problem is to change or modify the problem into a more amenable one. The present inventors realized that in order to further improve speech recognition accuracies, it would be highly advantageous to have more information regarding the detailed state of the many natural vocal articulators. Furthermore, it would also be advantageous to be able to drive or excite vocal tract portions or surfaces that do not currently contribute to natural speech, or to excite natural articulator portions in additional new ways. The important basic principle is the provision of new data for speech recognition processing.

Prior art commercial systems have only the natural sources 10 and 12 of FIG. 1 to excite the vocal tract filter system 22. Human evolution has admittedly produced a fine and recognizable speech output 26 for the ear and brain to discern and understand. However, human perception and human hearing are quite limited in what frequencies they can hear—even in an otherwise silent setting—and the very best recognition system available cannot compete with a human, especially in a noisy environment. The brain applies many knowledge systems to the problem, including contextual models not yet reproducible in software—nor even completely understood. However, in purely acoustic terms, the acoustic information the brain gets is limited by the acoustic perceptive ability of the human ear to hear tones and low-amplitude sounds and to discern them from each other and from interference; see, A. Syrdal et al, *Applied Speech Technology*, CRC Press (1995), page 28.

An important aspect of the present invention is that the vocal tract can be thought of as a dynamic filter bank whose articulatory positions (and articulated acoustic output) can further be deduced (or enhanced) using additional excitations not necessarily hearable by the human ear. In this manner, one may artificially produce both "natural" and "unnatural" sounds (by driving natural articulators in old or new ways or by driving unnatural articulators such as throat or sinus mucous-membranes which may vibrate only under the influence of the artificial excitation) and/or be able to spectrally "probe" or map the acoustic admittance of the filter bank in more detail. Furthermore, by conducting training sessions using at least the artificial excitations and analyzing the system-detectable acoustic output or responses, we have basic new information for model building and searching activities supportive of recognition analysis.

Along these lines of "providing more information" to help make such systems more robust, we have seen several ongoing efforts. Ronald Cole et al, *Survey of the State of the Art in Human Language Technology*, Cambridge University Press; Giardini Editori E Stampatori In Pisa (1997) in Sections 9.4–9.6 describe attempts to utilize facial expressions and/or body gestures in combination with the speech signal 28 to better deduce what words are being said and what their meaning might be. Video cameras which track the movement of the lips and eyes as well as the hands and arms have been designed and tested. These efforts will probably eventually help to some extent, but they demand the use of new equipment and the need for the user to be "on camera" even if the user is not visible to anyone other than the computer itself. They are also fraught with their own unique problems, such as sensitivity to lighting, head position, mood, use of makeup and the wearing of glasses or hands in front of the face as well as the introduction of a sensory means not easily made portable. Finally, D. Maurer et al, "Re-examination of the relation between the vocal tract and the vowel sound with electromagnetic articulography (EMA) in vocalizations", *Clinical Linguistics and Phonetics*, Vol. 7, No. 2, pp. 129–143 (1993) describes research which has shown the articulatory positions, including particular lip positions, are not necessarily unique as had been thought for many years. In fact, a given vowel apparently can be enunciated by more than one set of articulator filter states or positions.

U.S. Pat. No. 5,729,694, "Speech Coding, Reconstruction and Recognition Using Acoustics and Electromagnetic Waves", issued to J. F. Holzrichter et al on Mar. 17, 1998, describes the innovative use of miniature radar-imaging systems to image the interior of the vocal tract in real time and help deduce what is being said with the help of that particular incremental and direct information on articulator positions. Some serious potential problems with this technique are electromagnetic exposure and, even more so, the fact that some articulatory states are very very close to others and are exceedingly hard to discern even by direct observation (if that is possible). For example, the exact position of the tongue tip and the pressure with which it is held against (or very near) opposed oral tissue as air is forced past it makes a huge difference in how various consonants sound. MRI (magnetic resonance imaging) techniques, for example, have been shown to be too crude in spatial and temporal resolution to discern such tiny differences at speaking speed (or at any speed). The ambiguities discussed by Maurer et al, supra, compound these challenges.

In thinking about the problem of how voice recognition performance falls off so quickly in the presence of other speakers, interfering noises, or soft-spoken speech (and particularly whispered speech wherein voiced sounds are almost absent), the present inventors realized that what would be beneficial is a source, such as 10 and/or 12, which is artificial in nature such as a sound injection or even an acoustic probing device. Unlike the natural excitations naturally available from the larynx and vocal chords, an artificial excitation may have any desired spectral shape and/or duty cycle and may even operate to drive characteristic resonances in the vocal tract which cannot possibly be driven by human excitation sources 10 and 12 of FIG. 1 because of either poorly matched source/filter frequency response or frequency limitations of the natural exciters. In fact, such an artificial exciter may excite natural-speech resonances as well as such "unnatural resonances". Furthermore, since it is a computer system doing the hearing and we have the accepted opportunity to "train" or "enroll" the computer system, we can use the exciter and artificial speech sounds generated by it in the vocal tract to train, further train, or better train the computer. These new sounds producable by the human users vocal articulators (as excited by the artificial exciter) need only be "hearable" or detectable by the computer to be useful in improving robustness—they do not necessarily have to be audible to the user nor of normal audible loudness. This also opens up the opportunity to make different exciters operating for different speakers systems purposefully non-interfering—so that one may have their voice recognized by their computer even with several other unrelated speakers present and speaking in the background. In fact, the exciter concept may also (or alternatively) be implemented in an instrument-probe form wherein what one is doing is obtaining a full broadband spectral fingerprint of the articulation path and deducing from its various attenuations and resonance couplings more detailed information regarding the articulator states (or complex impedances) vs. time. Indeed, J. Epps et al, "A novel instrument to measure acoustic resonances of the vocal tract during phonation", *Meas. Sci. and Technol.*, Vol. 8, pp. 1112–1121 (1997) describe the use of such an acoustic lab desktop instrument used now in a few such labs for purposes of speech training and speech therapy. It makes clear that because of the richer harmonic content of such an artificial source, one may obtain more accurate estimates of spectral features such as formants as well as values for the complex acoustic impedance of the vocal tract. The reference does not suggest supporting backing-up, or serving as a voice recognizer nor does it demonstrate a comfortable acoustic injection device of a compact nature. Epps et al also utilized computational capabilities unable to support realtime high sampling rates. This reference teaches the stripping out and discarding of some natural speech components to get at the formants in a more accurate manner. Herein, the present inventors preferably utilize the natural components to the extent that they are present—and in several of the embodiments recognition-processing of both artificially excited and naturally excited speech signals for the same speech is conducted.

Before moving to the next Figure (FIG. 3), it is important to emphasize that the artificial exciter(s) may inject their acoustic energy from one or more paths to couple into the vocal apparatus, including into the mouth (from outside or from within), through the cheek, throat, tongue, palate, gums, teeth, neck, nasal passages, into other soft tissue or cartilage, into the facial bones, the skull or into the chest. The artificial exciter(s), for example, may also be arranged to operate in parallel with, simultaneous with, interleaved with, overlaid on or instead of the natural vocal chord exciters. It must also be emphasized that the recognition system of the invention may receive the returning and likely modified artificially excited acoustic signals by one or more means such as by: (a) via air-coupling, as by emanation from the mouth or nose (or alternatively from a radiating solid-body skin surface into the air) as for natural speech signals being picked up from the mouth by an air-coupled microphone; (b) via skin-contact coupling of a receiving transducer or sensor (possibly using a coupling gel or liquid) after passage through skin, bone, cartilage or mucous membranes; or (c) By optical tracking of a vibrating body portion such as laser-displacement sensing of the lips, cheeks or neck. In many of these cases, the reception means may also double as the excitation means, such as in the case of a send/receive piezoelectric transducer. It should be recognized that by injecting artificial acoustics which may be chosen to be different in nature than natural acoustic excitations (e.g., higher frequency, lower frequency, higher or lower amplitudes, added harmonics, phase-controlled, different duty cycles, mixed frequencies, etc.) one will have new articulators participating which may only be responsive to the artificial excitations. In the case of mixed signals and phased signals, one may also arrange for articulation to cause predictable signal interaction, reinforcement or cancellation of injected components.

Included in the list of vocal tract articulators or portions that may modify or modulate artificial excitations are: the glottal opening, the glottis, the arytenoids, the pharynx, the esophagus, the tongue, the pharyngeal walls, the velum, the soft and hard palates, any mucous membrane, the alveolar ridge, the lips, the teeth, the gums, the cheeks, any nasal cavity or oral cavity and even the larynx and vocal chords. It should be realized that an exciter for natural speech (e.g., the vocal chords) may double as or become instead an articulator of artificial excitations imposed on it.

Figure 3:
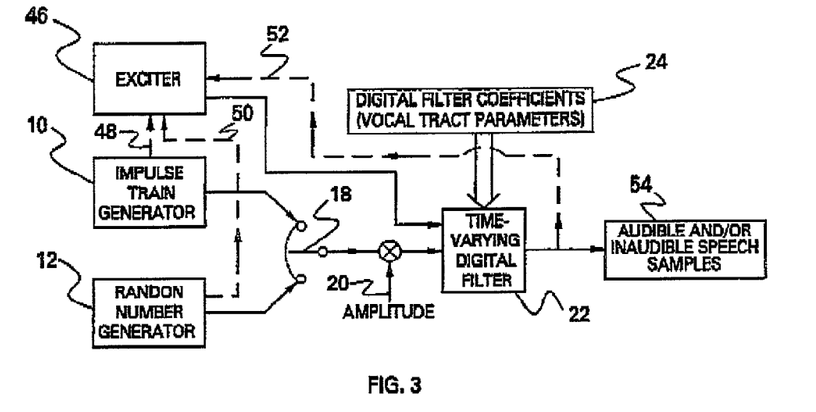
FIG. 3 is a schematic diagram of the invention in the form of a source/filter model showing it working to supplement the natural vocal chord/larynx excitation sources.

Turning now to a consideration of what the human speech digital model might look like incorporating the exciter(s) of the invention, FIG. 3, similar in general nature to FIG. 1, depicts a schematic digital representation of the human vocal system incorporating the exciter of the present invention. On the left hand side bottom of FIG. 3 are seen the familiar natural human-body exciters 10 and 12 related to the larynx and vocal chords. What is fundamentally new in FIG. 3 is the addition of artificial exciter 46. Exciter 46 is shown as depositing or injecting its acoustic energy into (directly or indirectly) the vocal tract filter bank 22 as is done by natural source exciters 10 and 12. Dotted phantom lines 48, 50 and 52 are shown to indicate that the control of artificial exciter 46 may utilize information regarding the state of natural vocal chord exciter 10, natural aspiration exciter 12; and filterbank 22 output, respectively. By way of more detailed example embodiments:

(a) If speech signal 54 were normally all naturally excited and found to be even momentarily too low in amplitude and getting hard to computer-recognize, artificial exciter(s) 46 could add more system-detectable amplitude and/or frequency components so that the speech signal gains extra artificial components or content and is thus more easily recognized. The extra signal components may or may not be humanly audible. These artificial components would at least be system-detectable for recognition purposes. Lines 48, 50, and/or 52 could represent detection of said insufficient natural excitation or naturally excited speech-signal output in this example.

(b) One could always have both natural 10, 12 and artificial signal 46 excitations operating—but only go back and analyze (model/classify and search) the artificial speech signal components if such recognition processing failed using only the natural components. In this manner, processing is minimized relative to full-time analysis of both artificial and natural signals also. In this manner, the artificial information represents accessible backup information. (avoiding re-utterance)

(c) If private "silent speech" via use of "mouthing the words" techniques were desired, exciter 46 could supplant exciters 10 and 12 and inject inaudible energy or frequency components (resulting in little or no human-audible "speech" sounds). The mouthing action would enunciate the words or utterances in the artificial spectral regime or time domain. Dedicated training for silent speaking could also be used if beneficial as the "word" models may be substantially different for mouthing without natural excitation(s).

(d) If multiple talkers are present then person #1 could have their exciter (e.g., 46-1) work on one frequency band(s) and person #2 (in another cubicle and having an unrelated but audible conversation) could have their exciter (e.g., 46-2) work on a second, non-interfering frequency band(s) or temporal duty cycle. (The individual exciters 46-1, 46-2 are not shown in FIG. 3, but each comprise an exciter 46.) In this manner, substantial additional information is made available to each person's own speech recognizer, which is known to be uniquely that of the person to be understood by that computer. Communication between such person's systems in order to set such different frequencies or sampling schemes could easily be done automatically—as for example, over a network, a wireless link, an infrared link, an acoustic link, or even a hardwired link. In this example, a person's system may process both natural and artificial signals full-time or may process only the artificial signal full-time—possibly using the natural elements only as backup. Finally, the multiple speakers may also be co-located, as in a meeting, and the recognition system is recognizing both speakers' speech.

(e) If the natural speech is one of voiced or unvoiced (as it usually is with very few exceptions when it is a combination of those), one may add excitation energy or frequency content characteristic of the other missing excitation if that provides useful information to further delineate articulator states. The added artificial content may excite the tract in an "unnatural" manner or in a natural manner or both, depending on how it is delivered and what its content is. Five preferred artificial excitations are (1) driving the tract at one or more harmonics (or sub-harmonics) of a natural formant with at least one skin-contact transducer (possibly using broadband excitation), (2) driving the tract with inaudible excitations such as ultrasonic tones or short frequency chirps using a skin-contact transducer, (3) driving the tract with phase-controlled frequencies which either interact with each other or themselves phase-shift as a function of articulator positions or states using one or more shin-contact transducers, (4) in the aforementioned probing approach, driving the tract with an air-coupled mouth speaker (injecting sound into the mouth), and (5) driving the tract with broadband excitation wherein induced tract resonances and off-resonance attenuations provide additional articulator position or state information—particularly wherein new articulators such as mucous membranes can be brought into play.

Again, it must be remembered that the excitation means may or may not also be the reception means and because of this, one will be coupling to the tract (loading the tract) differently with each arrangement. However, the important aspect is that for any arrangement there is a correlation between uttered speech and the received signal which represents new information.

(f) The exciter(s) 46 may be used for training where exciter(s) 46 gather(s) information regarding spectral details of the vocal system, such as precise resonances, formant values, or attenuation values, not measurable via natural-voice recognition alone. Such training may be done by reading prepared text as for training data 42 of FIG. 2 and/or by simply having the exciter(s) 46 spectrally map the vocal tract as the user speaks—such mapping contributing to the betterment of a model such as 36, 38, or 40 of FIG. 2. Such mapping would comprise taking spectral samples under various exciter 46 excitations. Recognition by the system of speech using one type of signal (e.g., the natural signal) allows for the remaining type of signal (e.g., artificial) and associated models to be associated with the recognized word. In this manner, system learning can also take place during normal use in a manner transparent to the user.

(g) The exciter may contribute to user identity verification wherein exciter(s) 46 provide(s) spectral maps of the user's vocal tract during speech or silence. The speech might be "good morning, computer" for example. The spectral map, either alone or in combination with the prior art recognition information, can enhance the security by making the system more difficult to fool and more friendly due to the familiar words said as opposed to a mandatory recitation of randomly-generated "I'm testing you" text. Artificial excitations for identity or user-verification may be selected at the time of use to prevent the using of a prerecorded voice for break-in. Matching done by such a security system may use a prior-sampled voiceprint containing artificial content or may even compare the users voice (with a randomly selected artificial excitation) to the expected response of an acoustic vocal-tract model of the user.

(h) The exciter(s) 46, because there is complete control over it (or them), may introduce a signal with known phase information. Normal human hearing does not significantly process phase information as far as is known. But using the present invention, one may sensitively detect with the speech recognition system the phase of one or more artificially excited speech signals—and indeed of their interaction with each other as a function of articulatory state. These represent more entirely new raw data.

(i) For any application, exciter(s) 46 could drive any known tract resonance at one of its higher (or lower) harmonics either to add more information to the spectrum or to decrease the audibleness of the excitation. It must be kept in mind that with the exciter(s), one can drive portions of the vocal tract segments and surfaces at both higher and lower frequencies than the natural vocal chords or aspiration can, regardless of whether these are harmonics of anything and regardless of whether they are being driven on-resonance or off-resonance.

Although the injection of acoustic excitation into the vocal tract filter system 22 has been shown in FIG. 3, an approach can be expressly incorporated wherein that acoustic content is injected (instead of or in addition to) into an existing exciter 10 or 12 such that that exciter is further excited (or differently excited) than is humanly possible. One can easily appreciate, for example, that to supplement or substitute for white noise (random aspiration noise) produced by air forced through open vocal chords (natural exciter 12), one could inject through the throat a more spectrally organized distribution of high frequency sounds particularly subject to substantial and obvious modification by a particular articulator such as the lips or tongue-tip. In this case, an information-enhanced artificial aspiration source is provided.

The exciter(s) 46 may take the form, for example, of a throat-mounted transducer or bone (head) coupled or chest coupled transducer. Bone vibration headsets ("excitation sources") are widely used by police and special forces. These emit audio acoustics directly into the skull through the thin intervening layer of skin. An example of a bone microphone is the "New Eagle" headset made by Streetsmart Professional Equipment. A throat injector would look much like a throat microphone such as that made by Pama Cellular Division of Manchester, England, except that it would emit rather than receive acoustic energy. Such transducers can be made, for example, using piezoceramics or miniature voice coils, as are widely known to the art.

Figure 4:
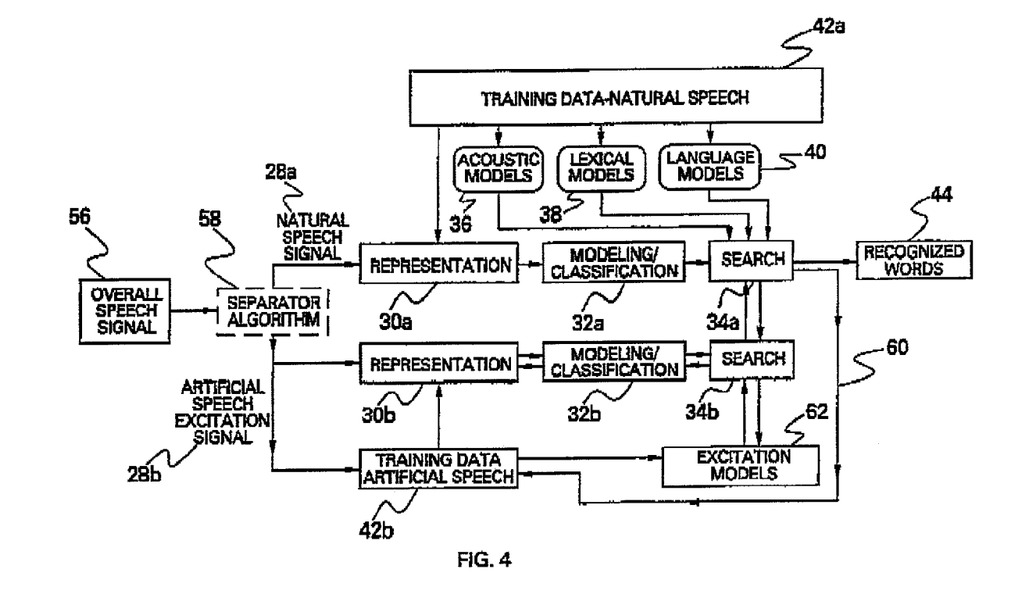
FIG. 4 is a schematic diagram of the invention as integrated into a speech recognition system wherein the natural and artificial-speech signals undergo separate processing.

FIG. 4 depicts a schematic of an example of a speech recognition system incorporating the invention. Starting from the left hand side of FIG. 4, a speech input 56 labeled "overall speech input" will be seen. It must be emphasized that by overall "speech" is meant sounds emanated by or from the vocal tract (detectable via the mouth or via any other head, neck or chest acoustic pickup, for example) containing one or both of natural sounds 28a and/or artificially excited sounds 28b (as excited by exciter 46 of FIG. 3). It should also be emphasized that any number of acoustic pickups may be used, including different ones for natural sounds 28a as opposed to artificially excited sounds 28b. Such pickups may be one or more of air-coupled, skin-contact coupled, or non-contact optically coupled.

An optional separator algorithm 58 operates, as necessary, to discern the natural sounds 28a from the artificial sounds 28*b*. Algorithm 58 may simply consist of a set of frequency (or temporal) electronic or software filters which control what input the recognition system or software hears and when it hears them. These filters are not to be confused with the anatomical acoustic filters of the vocal tract. Algorithm 58 may also consist of complex signal deconvolution means or of a simple signal subtraction means. This choice will depend significantly on whether the natural and artificial signals significantly interact with each other or whether they are relatively independent and can be treated simply as superimposed or additive signals. The system itself may be arranged to determine the optimal arrangement of algorithm 58 based on the users customized artificial excitation spectrum. In any event, the artificial signal content will be chosen based on its useful correlation to utterances of the tract.

Item 58 may be used, for example in the depicted schematic approach wherein different sound modeling/classification (32*a*, 32*b*) is used for natural sounds 28*a* and artificial sounds 28*b*, respectively. At least the natural speech signal 28*a* is routed to the familiar representation unit 30*a*, modeling/classification unit 32*a* and search unit 34*a* (as in FIG. 2). Again, search unit 34*a* has inputs from natural acoustic models 36, lexical models 38, and language models 40, which themselves are built upon connected natural training data 42*a*.

Also emanating from separator 58 is artificially-excited signal content 28*b*. As with the natural signal portion 28*a*, artificial signal 28*b* is routed through its own artificial signal representation module 30*b*, modeling classification module 32*b*, and search module 34*b*. On the right hand side of FIG. 4 is shown the artificial excitation search results from searcher 34*b* being made available to natural search module 34*a* and vice-versa to supplement the identification decision information available for speech signal recognition. In FIG. 4 is also shown artificial excitation sounds or "speech" 28*b* being routed to its own training data module 42*b*. It is to be emphasized that such a system may train itself incrementally during use (as well as before use as for 42*a*, prior art) using the artificially induced excitation sounds 28*b* which do not necessarily require any user awareness or attentive cooperation unless reading prepared teaching text is involved. In particular, feedback 60 from the combined search engine 34*a*, 34*b* results goes to the artificial excitation training module 42*b*. The idea here is that correlations between the natural models and the artificial models will exist and ought to be incrementally improved and kept track of and used to advantage in co-communication between search modules 34*a* and 34*b* for purposes of more accurate recognition.

It is to be emphasized for FIG. 4 that the main point being made is that artificial excitation induced acoustic signal 28*b* may be beneficially subject to similar processing as is conventional natural acoustic signal 28*a*. It is also to be emphasized that one may alternatively elect to treat the overall (combined) speech signal 56 as a single signal (shown in FIG. 5) not requiring breakdown by a separator 58, and thus there may then be only one module(s), each of the types 30, 32, 34, 36, 38, and 40 to treat the total mixed signal. It will also be noted that excitation model(s) 62 (analogous to 36, 38, and 40) are indicated in support of searching artificial sounds 28*b*. The nature of the lower branch (signal 28*b* signal path) in FIG. 4 should also be emphasized. As shown, largely parallel recognition subsystems for natural and artificial sound content are present—there being a final judgment at 34*a* at the end based on a weighting or comparison of both types of analysis, 34*a* and 34*b*. It will be noted that artificial speech 34*b* search results are fed to natural search box 34*a* for such comparison and weighting. One could alternatively do the two indicated recognition processes in series and use one to narrow the search space for the other in order to gain speed (or accuracy per unit time spent).

It has also been stated above that the artificial excitation(s) 46 can instead (or in addition) be treated as a fingerprinting device for characterizing the changing vocal tract filters 22. In this mode, rather than exciting acoustics analogous to the way the real vocal chords/larynx do, one can probe (via transmit/receive probing) the vocal tract in a broadband manner and obtain characteristic spectra which can be used as dynamic fingerprints used in addition to (or instead of) the modeling/classification modules 32*a* and 32*b*. In other words, as shown in FIG. 4, natural 28*a* and artificial sound 28*b* models are in modules 36, 38, 40, and 62, respectively. One could, in addition or instead of those sound model modules, have spectral models (not shown) whose data come from vocal tract spectra sampled by injecting artificial excitation(s) 46 and observing the response. Such spectra may be taken during speech or silence for the purposes of recognition and calibration/training, respectively. It will be realized that the artificial exciter(s) 46 may inject a very broadband signal allowing for the recording of a very detailed response spectra across a frequency range beyond that necessary for audible hearing (or "silent" inaudible speech) but still very useful for determining articulation positions. It must be kept in mind that because one may not hear it does not mean that it does not provide important information to the system. What matters is that the system can learn the association between artificially induced signals and any one or more of (a) simultaneously heard natural signals, (b) words which are read in a teaching exercise, and (c) words recognized using natural signals. Such "artificial speech signals" may be received by an external mouth microphone (with the natural signals) or may be received by the artificial exciter itself in the described "probing" fashion.

It will be recognized that a good reason to have dedicated processing sections for natural sounds as opposed to artificial sounds (as shown in FIG. 4) is that if discrete "silent speaking" is desired wherein generally inaudible sounds are excited by exciter 46 and words are mouthed, then one would want models available for those artificial sounds, as the natural excitations are not active or are at a low level. It is widely known that "whispered speech" contains primarily aspirated sounds and little voiced sound and therefore has to currently be processed several times and averaged to identify utterances, and even with that effort, the accuracy is extremely poor and not recommended for use. The invention herein provides a broadband excitation (if it is desired) of inaudible mouthed speech—an excitation which can be arranged to be inaudible as by at least one of low amplitudes or frequency excitation which are hard to naturally hear but easy to hear with the system hardware.

Finally, it will be obvious to the person skilled in this art that one may apply the embodiments of the present invention to one or both of continuous speech (discussed herein) or to discrete command-style speech (not discussed). It should also be obvious that one may arrange for the artificial sounds to be optimized for the user to maximize recognition performance. Thus, the artificial sounds may adapt, via learning, to the user and be unique for each user. This adaptation may include changes in frequency/temporal content, phasing or amplitude as well as changes in when the artificial excitations are delivered as a function of what is being said. The adapted excitations may then be used with any recognition system arranged to receive such signal content-or may be used only with the original system on which they were learned. The portability of these learned excitations is a part of this invention.

Figure 5:
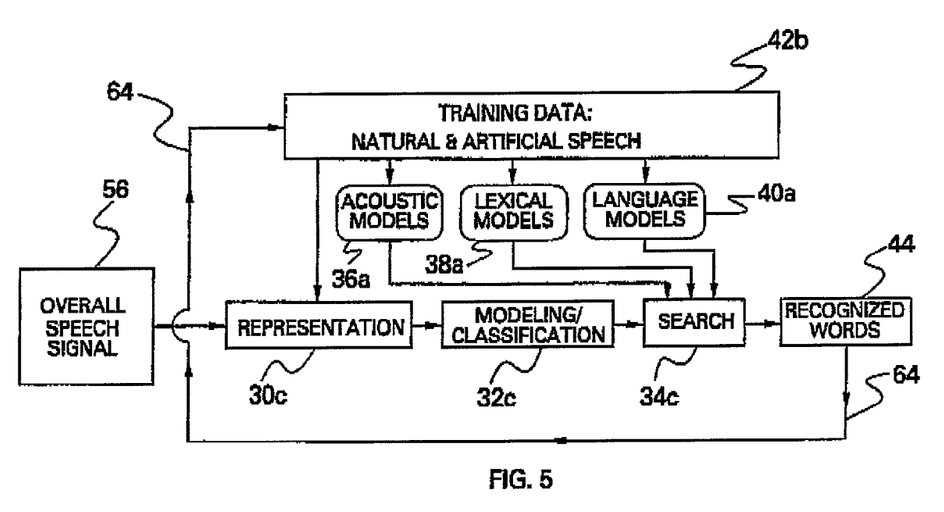
FIG. 5 is a schematic diagram of the invention as integrated into a speech recognition system wherein the natural and artificial speech signals, or content, are processed together.

Moving finally to FIG. 5, a combined natural and artificial speech signal 56 is processed through representation 30c, modeling/classification 32c and searching 34c to produce identified words 44. The acoustic models 36a, lexical models 38a and language models 40a may also be optimized for combined excitation speech. Note also that feedback loop 64 allows real-time training to take place in training module 42b (along with optional pre-use training via reading text).

It is important to recognize that the invention is fundamentally different than artificial sound sources used in patients who have had a laryngectomy. There is a considerable body of prior art patents pertaining to such devices; these include U.S. Pat. No. 3,766,318 ("Handheld Vibrator Artificial Larynx"), U.S. Pat. No. 4,039,756 ("Artificial Larynx with Prosodic Inflection Control"), U.S. Pat. No. 4,473,905 ("Artificial Larynx with Prosodic Inflection Control"), U.S. Pat. No. 4,502,150 ("Artificial Larynx with Prosodic Inflection Control"), U.S. Pat. No. 4,520,499 ("Combination Synthesis and Recognition Device"), U.S. Pat. No. 4,691,360 ("Handheld Voice Simulator"), U.S. Pat. No. 4,706,292 ("Speech Prosthesis"), U.S. Pat. No. 4,993,071 ("Post-Laryngectomy Speech Aid"), and U.S. Pat. No. 5,326,349 ("Artificial Larynx").

Firstly, the above-listed artificial sound sources are prostheses designed to recover some very small portion of lost natural speech in a dysfunctional anatomy. To date, none of these devices sounds even remotely natural, and more often provides crude, gravely and unpleasant monotonic sound. In any case, the present invention herein is not replacing normal audible speech when—audible speech recognition is the aim. Secondly, unlike such prostheses, the air flow out of the lungs or into the vocal tract is not utilized to aerodynamically generate or modify sound. Rather, sound is generated ignorant and oblivious to airflow, and in fact, in the described embodiments, the artificial exciter(s) is/are usually outside of the airflow path. Most of the embodiments herein allow for recognition accuracy improvement by having dual or redundant speech signals, or allow for inaudible mouthed speech. The afore-mentioned prostheses represent a single, much cruder speech signal, allowing far lower recognition accuracy than even the natural voice alone. In fact, the present inventors are not aware of any such prostheses that allows for continuous speech to be recognized with even very poor accuracy, nor of any prostheses that produces speech content that could be overlaid on normal speech without it being grossly unpleasant.

The present inventors also realize that if the artificial exciter(s) are placed in a location other than at the vocal chord/larynx location then they "see" an acoustic loading by the filter bank (vocal tract) different than that of the vocal chords. In fact, this is turned to advantage in that one will get additional and different excited signals from the tract and these different signals are discernible from any natural signals in many cases. Furthermore, it should be specifically again recognized that the generated artificial "speech" signal content need not be humanly audible nor humanly intelligible. In all circumstances, the artificially generated "speech" signal will correlate with articulatory positions or with mouthed or spoken utterances. There is no need for this correlation to be the same as that for the natural speech signal, and in fact it being different gives one added independent data to recognize such utterances.

INDUSTRIAL APPLICABILITY

The voice recognition scheme disclosed herein is expected to find use in a wide variety of applications, including (a) provision of a robust speech interface to computer, terminals, personal electronic products, games, security devices and identification devices, (b) for non-interfering recognition with multiple speakers or voices present, (c) for the automatic recognition of multiple speakers and discerning them from each other, (d) for discrete or silent speaking or command-giving speech recognition, and (e) for the option of having a portable user-customized artificial enhancement excitation useable with more than one recognition system.

Thus, there has been disclosed a voice recognition scheme involving signal injection coupling into the human vocal tract for robust audible and inaudible voice recognition. It will be readily apparent to those skilled in this art that various changes and modifications of an obvious nature may be made, and all such changes and modifications are considered to fall within the scope of the present invention, as defined by the appended claims.

What is claimed is:

1. A speech recognition system for processing sounds emanating from a living body's vocal tract, said sounds including sounds excited by at least one artificial exciter coupled, either directly or indirectly, into said vocal tract to introduce artificial excitations, said at least one artificial excitation modified or modulated by said vocal tract and emanating therefrom, said speech recognition system including:
   means for representation, modeling or classification or both, and searching of artificially excited speech signals or signal components;
   means for representation, modeling or classification or both, and searching of naturally excited speech signals or signal components;
   at least one of said searching means having access to at least one of an acoustic model, lexical model or language model; and
   at least one training means.

2. The speech recognition system of claim 1 wherein said sounds are one of continuous speech, command-style speech, or an utterance.

3. The speech recognition system of claim 1 further including means for directing at least a naturally excited second modified or modulated signal to a speech representation means which samples said naturally excited signal to produce a second sequence of speech representation vectors, representative at least in part of said natural speech signal.

4. The speech recognition system of claim 3 further including second means for modeling or classifying said second sequence of vectors representative, at least in part, of said naturally excited speech signal.

5. The speech recognition system of claim 4 further including second means for subjecting said modeled or classified natural speech vectors to a search in a second search module said search module having access to at least one of an acoustic model, a lexical model or a language model.

6. The speech recognition system of claim 1 wherein training means are provided for both naturally excited signals and artificially excited signals, said means being one of independent or the same means, said signals being one of separate or combined.

7. The speech recognition system of claim 1 wherein artificial excitations are adapted to an individual user.

8. The speech recognition system of claim 7 wherein said adapted excitations are portable across at least one of multiple recognition systems, computers, networks, and speech-conversant devices.

9. The speech recognition system of claim 1 further including a separator, deconvolution, or subtraction means to discern naturally excited sounds or sound components from artificially excited sounds or sound components.

10. The speech recognition system of claim 1 wherein said artificially excited sounds permit inaudible speaking or command-giving to a computer, computer-coupled device, or computer-containing device.

11. The speech recognition system of claim 1 adapted for processing sounds that are both naturally excited and artificially excited, said sounds, or signal representations thereof, being substantially processed as one of separate or separated signals or signal-components or as a combined signal.

12. The speech recognition system of claim 11 wherein said artificially excited sounds permit improved recognition-accuracy or improved recognition-speed of natural speech, sounds or utterances.

13. The speech recognition system of claim 11 wherein said artificially excited and naturally excited speech sounds emanating from said tract temporally overlap at least part of the time.

14. The speech recognition system of claim 11 wherein said artificially excited and naturally excited speech sounds emanating from said tract are not identical in spectral content at least part of the time.

15. The speech recognition system of claim 11 wherein said artificially excited signal, before or after tract modification or modulation, includes at least one of the following aspects: (a) said artificially excited signal contains a harmonic or subharmonic of a natural formant, (b) said artificially excited signal contains phase information which is utilized in the recognizer, (c) said artificially excited signal is broadband in nature, (d) said artificially excited signal is selected or set as a function of any natural signal parameter, (e) said artificially excited signal contains tones or frequency components which interact with each other as a function of a vocal tract parameter, (f) said artificially excited signal contains at least one tone or frequency component which is modulated or modified by any portion of the vocal tract anatomy, (g) said artificially excited signal is generally inaudible to the unaided ear of a separate listener, and (h) said artificially excited signal is swept in frequency.

16. The speech recognition system of claim 1 wherein said vocal tract includes at least one element selected from the group consisting of vocal chords, larynx, laryngeal valve, the glottal opening, the glottis, the arytenoids, the pharynx, the esophagus, the tongue, the pharyngeal walls, the velum, the hard palate, the alveolar ridge, the lips, teeth, gums, cheeks or any nasal cavity, at least said one element modifying or modulating said artificial excitation as the speaker articulates speech either audibly or inaudibly.

17. The speech recognition system of claim 1 further including means for directing at least a first modified or modulated artificially excited speech signal to a first speech representation means which samples at least said first signal to produce a first sequence of speech representation vectors, representative at least in part, of said artificially excited signal.

18. The speech recognition system of claim 17 wherein both the artificially excited signal and the naturally excited signal are represented by a single set of representation vectors.

19. The speech recognition system of claim 17 further including means for modeling or classifying said first sequence of vectors.

20. The speech recognition system of claim 19 further including means for subjecting said modeled or classified vectors to a search in a search module, said search module having access to at least one of an acoustic model, a lexical model, or a language model.

21. The speech recognition system of claim 20 wherein two search modules operate, one arranged to process naturally excited signals and the other to process artificially excited signals, said system utilizing the results of both modules to decide what speech took place or what words were articulated.

22. The speech recognition system of claim 1 further including a training data means capable of supporting training using at least the artificially excited speech signals.

23. The speech recognition system of claim 1 wherein said at least one artificial excitation is chosen based on an optimized correlation between it and known words or utterances made available during training.

24. A method of performing speech recognition on silently-mouthed, silently-articulated or whispered speech or unterances from a living body's vocal tract, comprising:
providing a source of artificial acoustic excitation;
coupling said artificial acoustic excitation, directly or indirectly, into said vocal tract of a speaker;
allowing said artificial acoustic excitation to be modified or modulated by said speaker's mouthing, articulation or whispering action by a state of at least a portion of said speaker's vocal tract;
performing speech-recognition processing on at least a portion of or component of said modified acoustic excitation to contribute to the identification of said speech or utterance; and
choosing said at least one artificial excitation based on an optimized correlation between it and known words or utterances made available during training,
wherein said speech-recognition processing includes processing said modified acoustic excitation through representation, modeling or classification or both, and searching to produce identified words or utterances.

25. The method of claim 24 wherein said speech or utterance is silently mouthed and any modified acoustic excitation is primarily sourced from said artificial excitation.

26. The method of claim 24 wherein said speech or utterance is whispered and the modified acoustic excitation is sourced both by said artificial excitation as well as by, at least in part, natural aspiration excitation.

27. The method of claim 24 wherein said speech or utterance is one of continuous speech, discrete speech, or command-style speech.

28. The method of claim 24 wherein said coupling is acoustic coupling of an infrasonic, sonic, or ultrasonic transducing device, directly or indirectly, to at least one portion of said vocal tract.

29. The method of claim 24 wherein said coupling is one of tissue coupling or air-coupling.

30. The method of claim 24 wherein said recognized speech or utterance is at least one of recorded, converted to text, transmitted using a telephony link, transmitted to a remote recipient or computer, or used in carrying out a further task.

31. The method of claim 24 wherein said artificial excitation is itself inaudible at least to an external observer.

32. A method of enhancing the accuracy or speed of speech recognition of the speech or utterances emanating from a living body's vocal tract, comprising:

coupling artificial acoustic excitation, directly or indirectly, into said vocal tract of a speaker;

allowing said speaker to audibly speak;

at least during portions of said audible speech, allowing said artificial acoustic excitation to be modified or modulated by said speaker's mouthing, articulation or whispering action by a state of at least a portion of said speaker's vocal tract to provide an artificially excited output of said speaker; and performing speech-recognition processing using at least portions of both naturally excited and artificially excited outputs of said speaker, to thereby provide enhanced accuracy or speed of said speech or utterance recognition; wherein said speech-recognition processing includes processing said modified acoustic excitation through representation, modeling or classification or both, and searching to produce identified words or utterances and wherein the acoustic output of said vocal tract containing both types of acoustic outputs is speech-recoanition processed, at least in part, as separate natural and artificial signals.

33. The method of claim 32 wherein the acoustic output of said vocal tract containing both types of acoustic outputs is speech-recognition processed, at least in part, as a combined signal.

34. The method of claim 32 wherein said speech is one of continuous speech, discrete speech, or command-style speech or utterance.

35. The method of claim 32 wherein said artificial acoustic excitation is temporally overlaid or interleaved, at least in part, with a natural tract excitation.

36. The method of claim 32 wherein said artificial acoustic excitation is applied using feedback information relating to a state of a natural excitation or of an articulatory position or state.

37. The method of claim 32 wherein said artificially excited acoustic output is recognition-processed when naturally-produced acoustic output is determined insufficient to alone identify said speech or utterance with a desired accuracy or speed.

38. The method of claim 32 wherein an artificial acoustic excitation is triggered by a state of natural excitation or a state or an articulator or vocal tract element.

39. The method of claim 32 further comprising:

choosing said at least one artificial excitation based on an optimized correlation between it and known words or utterances made available during training.

40. A system for improving the accuracy, robustness, or speed of the speech-recognition of utterances made by a speaker comprising:

a subject speaker emanating at least one naturally audible utterance from his/her vocal tract;

an artificial acoustic excitation means for speech-recognition enhancement of natural and audible speech and utterances coupled, either directly or indirectly, into said speaker's vocal tract, without interfering with or modifying breathing or aspiration, for use at least in healthy vocal tracts;

the excitation means operated by said system to excite at least one additional of (a) an artificial audible emanation from the speakers modulating tract and (b) an artificial inaudible emanation from the speakers modulating tract;

the system utilizing both the natural audible signal and at least one of the additional artificial audible or artificial inaudible signals to perform speech recognition;

the system having representation means and at least one of modeling means and classification means, a searching means, a training means and a directly or indirectly tract-coupled exciter; and the system being teachable by the speaker.

41. The system of claim 40 wherein the utterance is one of (a) words, (b) commands, (c) whispered words or commands, (d) mouthed words or commands, (e) a name or password, or (f) a response to a prompt given by a security device.

42. The system of claim 40 wherein the artificial excitation means includes at least one acoustic transducer either directly or indirectly coupled into said speaker's vocal tract.

43. The system of claim 40 wherein the teaching step includes the system listening to both audible natural signals and at least one of artificial audible or artificial inaudible signals, either simultaneously or in sequence as both are modulated by the speaker.

44. The system of claim 40 wherein an artificial excitation is encoded or chosen such that it is identifiable as belonging to an assigned speaker.

45. The system of claim 44 wherein such encoding or choosing allows a speech recognition system to help differentiate between two or more speakers who both speak simultaneously or in sequence.

46. The system of claim 40 as used to improve speech recognition accuracy, robustness, or speed in a noisy environment.

47. The system of claim 40 wherein at least one acoustic excitation is optimized for a particular speaker or for a particular environment.

48. The system of claim 40 wherein one or more audible and/or inaudible microphones or pickups is utilized to acoustically receive said emanating signals.

49. The system of claim 40 wherein said speech recognition is performed locally or remotely and the resulting recognized speech is at least one of: (a) transmitted to a remote location, (b) recorded, (c) used to instruct a machine or computer or other electronic device, (d) used as part of a security system, (e) converted to text or to a synthetic voice, (f) translated into another language, (g) recognized using stored teaching data or personal files, and (h) representing spoken words, whispered words, commands, or mouthed utterances.

50. The system of claim 40 wherein after said teaching utilizing natural audible and at least one inaudible signal is completed, the trained system is then used to recognize inaudible speech or whispering.

51. The system of claim 40 as used to identify the voice of an unknown speaker for security reasons.

52. The system of claim 40 wherein the exciter is excited by at least one of:

(a) broadband excitation, (b) narrow band excitation(s) or a harmonic frequency of a natural formant, (c) at least one tone, (d) excitations which are delivered as a function of the success of ongoing natural-speech recognition, and (e) excitations which are feedback-optimized for each speaker.

53. The system of claim 40 wherein during recognition processing, both natural speech and artificial speech components are processed at at least some point.

54. A system for providing speech or utterance-recognition processing of improved accuracy or robustness, said speech or utterances comprising one or more of audible or inaudible (a) speech, (b) commands, (c) whispers, (d) mouthings or sounds, said system comprising:
- a speech recognition system capable of recognizing at least one natural or artificially induced audible or inaudible acoustic emanation emanating from a speaker's vocal tract, said speech recognition system including an artificial exciter for speech-recognition enhancement of natural audible and utterances that does not interfere with or modify breathing or aspiration, for use at least in healthy vocal tracts, said speech recognition system further including representation means and at least one of modeling means and classification means, a searching means, a training means and a directly or indirectly tract-coupled exciter, and
- a vocal tract acoustic-probing means which measures at least one of (a) an acoustic impedance or admittance, (b) an acoustic resonance or harmonic, (c) a vocal tract spectral fingerprint, wherein a combination of the first speech recognition process and at least one second acoustic measurement process provide complimentary information allowing for a more accurate or robust overall speech recognition process.

55. The system of claim 54 wherein the acoustic probing means is also capable of artificially exciting audible or inaudible vocal tract emanations at least some of which are modulated by said tract.

56. The arrangement of claim 54 wherein during recognition processing, both natural speech and artificial speech components are processed at at least some point.

57. An arrangement for improving the accuracy, robustness, or speed of the speech-recognition of natural audible speech and utterances made by a speaker, said arrangement comprising:
  (a) a teachable speech recognition system comprising at least a speech sampling means and a search means, said system capable of detecting modulations or modulation activity of said speaker's vocal tract and relating said modulations to learned utterances; and
  (b) an artificial acoustic excitation means and an associated artificial acoustic reception means, represented collectively by one or more body-contacting, skin contacting or bone contacting transducers for speech-recognition enhancement of natural audible speech and utterances that does not interfere with or modify breathing or aspiration, for use at least in healthy vocal tracts;
wherein:
  (1) the artificial acoustic excitation is transmitted directly or indirectly into the speakers vocal tract and is modulated by said utterances;
  (2) said modulated artificial excitations being detected by at least one said contacting transducer reception means; and
  (3) said speech recognition system utilizing at least said artificial modulated excitations and representation means, at least one of modeling means and classification means, a training means and a directly or indirectly tract-coupled exciter for recognition processing.

58. The arrangement of claim 57 wherein during recognition processing, both natural speech and artificial speech components are processed at at least some point.

59. An arrangement for providing speech or utterance-recognition processing of improved accuracy or robustness, said speech or utterances comprising one or more of audible or inaudible (a) speech, (b) commands, (c) whispers, (d) mouthings or sounds, said arrangement comprising:
  (a) a speech recognition system capable of recognizing at least one of natural or artificially induced audible or inaudible acoustic modulations of a speaker's vocal tract, and
  (b) at least one artificial acoustic emitter, exciter or transducer and at least one acoustic receiver or pickup, or a single acoustic device serving both emitter/exciter and receiver functions, the artificial emitter, exciter or transducer capable of speech-recognition enhancement of natural audible and utterances that do not interfere with or modify breathing or aspiration, for use at least in healthy vocal tracts,
wherein:
  (1) at least one of said acoustic devices is skin or bone coupled,
  (2) the emitter/exciter exciting artificial audible or inaudible acoustics which are modulated, at least in part, by the speaker's vocal tract,
  (3) the receiver detecting said modulated artificial acoustics and making them available in support of recognition-processing by the speech recognition system, and
  (4) the system being taught to recognize using utterances which comprise, at least in part, said modulated artificial acoustics, the system further including representation means and at least one of modeling means and classification means, a searching means, a training means and a directly or indirectly tract-coupled exciter.

60. The arrangement of claim 59 wherein at least one acoustic emitter and at least one acoustic receiver are each at least one of skin or bone coupled.

61. The arrangement of claim 60 wherein at least one receiver receives acoustic emissions originating from at least one emitter after said emitted artificial acoustics have been modulated by the speaker's modulating vocal tract.

62. The arrangement of claim 61 wherein at least one emitter and at least one receiver are at different skin or bone-contacting locations on the body.

63. The arrangement of claim 59 wherein said recognition portion of the system is, at least in part, remote from the speaker.

64. The arrangement of claim 59 wherein during recognition processing, both natural speech and artificial speech components are processed at at least some point.

* * * * *